Figure 1:
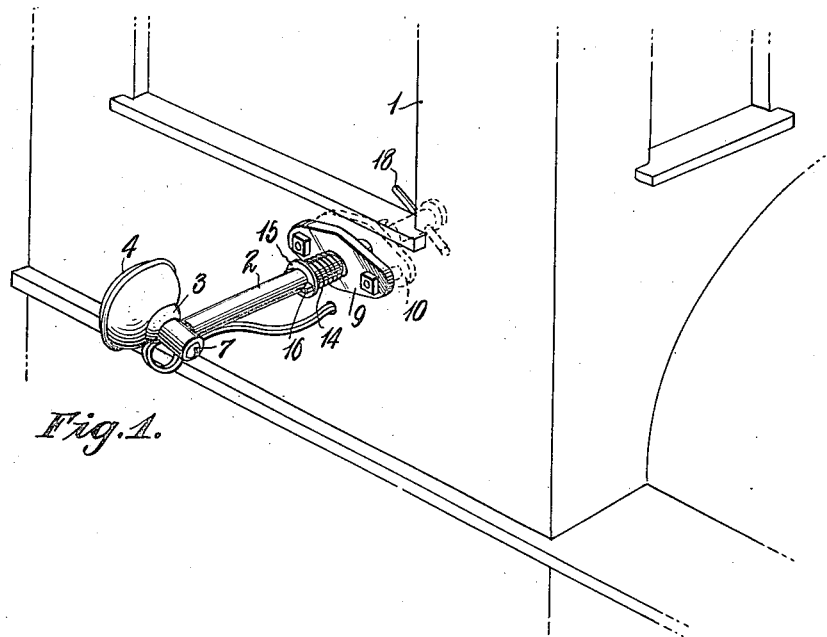

E. COWLES.
SIGNALING DEVICE.
APPLICATION FILED APR. 30, 1921.

1,435,632.

Patented Nov. 14, 1922.

Inventor
Eugene Cowles
By Bacon & Thomas,
Attorneys

Patented Nov. 14, 1922.

1,435,632

UNITED STATES PATENT OFFICE.

EUGENE COWLES, OF SHELBYVILLE, KENTUCKY.

SIGNALING DEVICE.

Application filed April 30, 1921. Serial No. 465,888.

*To all whom it may concern:*

Be it known that I, EUGENE COWLES, a citizen of the United States of America, residing at Shelbyville, in the county of Shelby and State of Kentucky, have invented certain new and useful Improvements in Signaling Devices, of which the following is a specification.

The invention relates to improvements in a signaling device adapted for use in connection with locomotives, automobiles, or like vehicles.

It is an object of the invention to provide a shiftable light under the control of a vehicle operator which may be moved so as to direct the light rays in different paths, whereby the operator of a following vehicle is able to determine the position of the preceding vehicle so as to prevent collisions or other accidents.

The invention is particularly useful for application to railway locomotives wherein the light may be adjusted to indicate when a locomotive is on a siding so that the driver of a following locomotive will know that the track is clear, while another position of the light will indicate that a locomotive is on a main track and gives sufficient warning to the following locomotive to prevent collision. The light is preferably of sufficient strength so as to be visible for material distances, and in carrying out my invention I mount the light upon a support whereby the same is capable of being turned so that the rays are directed in a vertical path or shifted to direct the rays in a horizontal path, the directions in which the rays are projecting indicating to a following locomotive or vehicle the movements of the preceding vehicle, which rays may act as a signal to inform the following vehicle that the locomotive is to stop, that it is on a siding, or that it is moving on the main track.

In the drawings I have disclosed a preferred embodiment of my invention, but it will be understood that this is merely for the purpose of illustration, and the invention can be embodied in other mechanical structures without departing from the spirit thereof.

Figure 2:
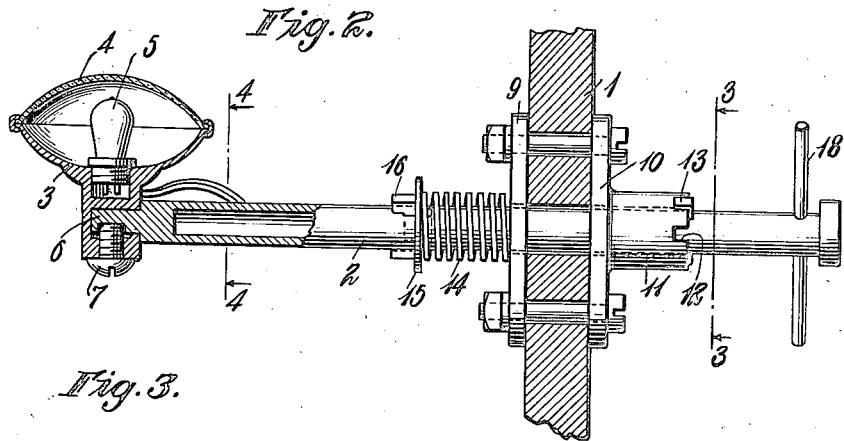
Figure 3:
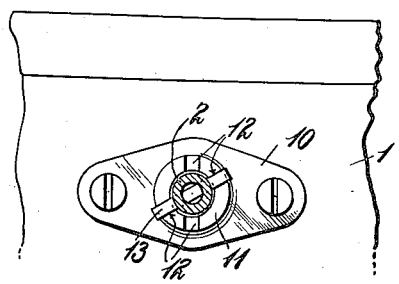
Figure 4:
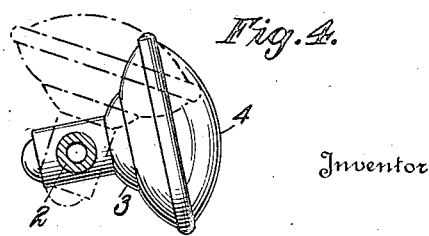

In the drawings, Figure 1 represents a view of the signal attached to a locomotive cab. Figure 2 is a view of the device with parts in section; and Figures 3 and 4 are detail views.

Referring now more particularly to the drawings, wherein like reference characters indicate corresponding parts, I have shown the signaling device as being applied to a railway locomotive, although I wish it to be distinctly understood that the same is applicable to other vehicles, such as automobiles or the like. As shown, the signaling device is attached to the front end of the vehicle cab 1, and consists of an elongated arm 2, having mounted upon one end a detachable light projector 3 provided with a lens 4, and a suitable electric bulb 5. This light fits upon a reduced end 6 of the elongated rod 2, and is maintained in position by a fastening screw 7 which passes through an aperture in the shank or the like, and engages the reduced end 6. The elongated rod 2 passes through the side of the cabin, and is mounted for a reciprocating movement in brackets 9 and 10 attached to the inner and outer sides of the cabin. The bracket 10 is formed with a projecting sleeve 11 having separated notches or apertures 12 therein, which receive pins 13 projecting from the portion of the rod 2 located within the interior of the cabin.

The rod 2 is normally maintained in a position whereby the pins 13 are caused to enter a certain set of the notches 12 in the sleeve of the bracket 10, and to maintain the elongated rod in this position I surround the same with a coil spring 14 bearing at one end against the outside bracket 9, and at its opposite end engaging a washer 15 maintained in position by a cross key 16 passing through an aperture in the rod.

The tendency of the spring, is, as before stated, to urge the elongated rod outwardly, so that the pins enter the notches 12, and to shift the rod and its light projector 3 I provide upon the inner end of the rod a handle 18 which is engaged by the operator and moved inwardly against the tension of the coil spring so as to enable the rod to be shifted whereby the position of the light may be changed so that the lens is directed vertically, or horizontally or in any positions which may be desirable, it being understood that the path of the rays are indicative of the location or movements of the vehicle to which the indicating device is attached.

From the foregoing it is thought that the construction of the device will be clearly understood, and the operation thereof may be briefly recited as follows: Assuming that the indicator is applied to a locomotive, and the engineer has run the locomotive on a siding, it is then highly desirable that the engineers of following trains should be in a position to know that the locomotive is on a siding, and the track is clear, and to enable this, the locomotive engineer engages the handle on the elongated rod 2 and shifts the rod until the light projector 3 is directed upwardly. This will throw the light rays in the air, which rays are visible for a considerable distance, and the engineer of a following locomotive will by this signal know that the track is clear, and the locomotive in advance of him is on a siding.

Should the locomotive, however, be moving at a slow rate of speed on the main track to prevent a collision, the engineer will engage the handle and shift the rod 2 to bring the light projector 3 in a horizontal position directing the light rays rearwardly, which rays are sufficiently strong to be visible for a material distance, and the engineer of a following train will then be definitely informed that the track is not clear, but is occupied by a moving train so that a collision will be avoided. Collisions on curves may be also avoided by the manipulation of the light, and while I have herein described the light as occupying two positions, the same may be shifted so as to occupy any number of positions, each position of the light being indicative of a signal known to the railway engineers as may be found desirable in the operation of trains, the entire system of signaling being very simple and so efficient as to be able to supersede the complicated and unreliable signals now employed by a great many railways.

If the device is applied to an automobile or other vehicle, the operation is very similar, the position of the light informing a following vehicle whether the preceding vehicle is at standstill, or is moving on a main road and will manifestly prevent many collisions.

Having thus described the invention, what I claim is:

1. A signaling device adapted to be applied to a vehicle comprising a slidable and rotatable light support, a light mounted upon one end thereof, a bearing for said support, a handle at the opposite end of the support, means for maintaining said support in its different positions of adjustment, said means comprising cooperating notches in the bearing and a locking pin on the support, and a resilient member surrounding the support normally maintaining said pin in one of the notches.

2. A signaling device adapted to be applied to a vehicle comprising a slidable and rotatable light support, a light mounted on one end thereof and fashioned to direct light rays through a single lens, a handle on one end of said support, a bearing for said support through which the same passes, said bearing having notches disposed therein, a locking pin carried by the support and engaging said notches, a resilient member normally maintaining said pin in engagement with the notches, said support being adapted to be moved inwardly, and then rotated to place the light in different positions to direct light rays in different paths.

In testimony whereof I affix my signature.

EUGENE COWLES.